(No Model.)
J. C. TROUT.
MOLE TRAP.
No. 447,417. Patented Mar. 3, 1891.
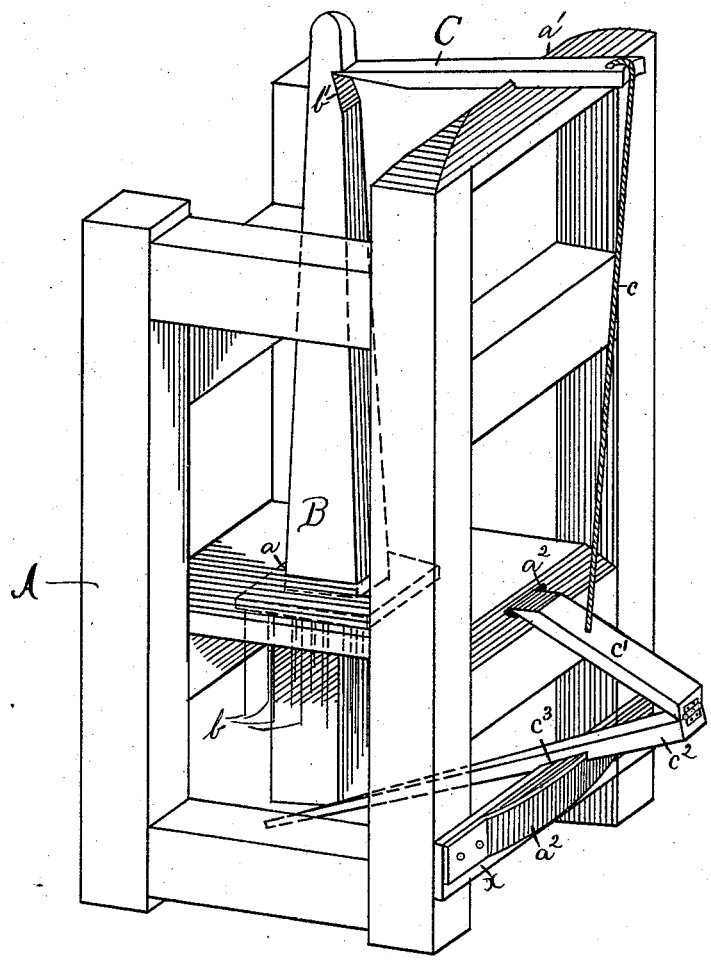
WITNESSES:
A. E. Glascock
M. E. Lansdale
INVENTOR
J. C. Trout
BY
John S. Duprie
ATTORNEY.

UNITED STATES PATENT OFFICE.

JAMES C. TROUT, OF MORRILLTON, ARKANSAS.

MOLE-TRAP.

SPECIFICATION forming part of Letters Patent No. 447,417, dated March 3, 1891.

Application filed September 29, 1890. Serial No. 366,480. (No model.)

*To all whom it may concern:*

Be it known that I, JAMES CRISTERFER TROUT, a citizen of the United States, residing at Morrillton, in the county of Conway and State of Arkansas, have invented certain new and useful Improvements in Mole-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to mole-traps; and it consists in the novel construction and arrangement of its parts.

In the accompanying drawings, the figure represents a perspective view of my invention.

My invention is described as follows: I construct a suitable frame A with a perforation $a$, a pivot $a'$, a notch $a^2$, and near the bottom of said frame I attach in a suitable manner a cross-piece $x$, with a strip of spring metal $a^2$ attached thereto. Working in the perforation $a$ is a perpendicular shaft B, its lower end provided with the spikes $b$ and having in its upper end a notch $b'$. Fulcrumed on pivot $a'$ is a lever C, to one end of which is attached one end of a cord $c$. The other end of said lever works in the notch $b'$ of the shaft. The other end of the cord $c$ is attached to a bar $c'$, one end of which works in the notch $a^2$, and the other end is hinged to a trigger $c^2$. Trigger $c^2$ is provided with a depression $c^3$, which rests over the cross-piece $x$ and against spring $a^2$, and the free end of said trigger rests upon the ground.

My invention is operated as follows: The free end of the trigger $c^2$ is placed against the roof of a mole-path after said roof has been slightly mashed in, and when the mole comes along he will endeavor to repair the path, and in doing so he pushes the free end of said trigger up, and the depression $c^2$ will rise above the cross-piece $x$ and the spring $a^2$ will throw the trigger and its attachments out and away from the trap and will allow the shaft B to descend and cause the spikes $b$ to pass through the body of the mole.

It will be seen that the chief advantage of my invention is that the spring $a^2$ will throw the trigger and its attachment out and away from the trap; otherwise, without said spring the trigger would fall under the shaft B and prevent the spikes from piercing the mole.

Having described my invention, what I claim as new, and desire to secure by Letters Patent, is—

1. The combination of the frame A, having the perforation $a$, pivot $a'$, notches $a^2$, and cross-piece $x$, the shaft B, having the spikes $b$ and notch $b'$, lever C, fulcrumed on pivot $a'$, one end working in notch $b'$, cord $c$, one end attached to the free end of lever C and the other to bar $c'$, bar $c'$, one end working in the notch $a^2$ and the other end hinged to trigger $c^2$, trigger $c^2$, having the depression $c^3$, working over the cross-piece $x$, with its free end resting on the mole-path, and spring $a^2$, one end secured to said cross-piece $x$ and its free end resting against the outer wall of depression $c^3$ and adapted to throw said trigger from under the trap when released, substantially as shown and described.

2. In combination with a mole-trap, substantially as shown and described, the spring $a^2$, one end secured to the cross-piece $x$ and its other end working in the depression $c^3$ of the trigger $c^2$ and adapted to throw said trigger from under the trap when said trigger is released, substantially as shown and described.

In testimony whereof I affix my signature in presence of two witnesses.

J. C. TROUT.

Witnesses:
 G. F. SCROGINS,
 S. A. TROUT.